United States Patent
Ignaczak et al.

(10) Patent No.: US 8,210,575 B2
(45) Date of Patent: Jul. 3, 2012

(54) BAND CLAMP WITH EMBOSSED GASKET FOR SLOTTED PIPE LAP JOINTS

(75) Inventors: Brian T. Ignaczak, Rochester, MI (US); David Leo Wyatt, Jr., Lenox Township, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 16 days.

(21) Appl. No.: 12/843,236

(22) Filed: Jul. 26, 2010

(65) Prior Publication Data

US 2011/0018263 A1 Jan. 27, 2011

Related U.S. Application Data

(60) Provisional application No. 61/228,402, filed on Jul. 24, 2009.

(51) Int. Cl.
*F16L 17/00* (2006.01)

(52) U.S. Cl. ......... 285/337; 285/403; 285/419; 285/420

(58) Field of Classification Search .................. 285/400, 285/403, 382, 419, 420, 367, 349, 350, 337
See application file for complete search history.

(56) References Cited

U.S. PATENT DOCUMENTS 2,531,401 A * 11/1950 Clerke .......................... 285/349

FOREIGN PATENT DOCUMENTS

| JP | 05-077691 U | 10/1993 |
|----|----|----|
| JP | 09-228833 A | 9/1997 |
| JP | 09-273679 A | 10/1997 |
| KR | 10-2004-0096757 A | 11/2004 |

OTHER PUBLICATIONS

International Search Report for PCT/US2010/043204, Feb. 23, 2011, 3 pages.
Written Opinion for PCT/US2010/043204, Jan. 21, 2011, 3 pages.

* cited by examiner

*Primary Examiner* — Aaron Dunwoody
(74) *Attorney, Agent, or Firm* — Reising Ethington P.C.

(57) ABSTRACT

A band clamp used for forming a pipe lap joint. The band clamp includes a band, tightening mechanism, and gasket. The band extends circumferentially from a first end to a second end and is sized to fit over an outside pipe end. The tightening mechanism is connected to the band at the first and second end. The tightening mechanism includes at least one fastener to bring the first and second ends toward each other to tighten the band over the outside pipe end. The gasket is constructed to fit over an inside pipe end and within the outside pipe end such that the gasket is at least partially sandwiched between said inside and outside pipe ends. The gasket has an embossment extending radially outwardly from an outer surface of the gasket and being constructed to be received at least partly within a slot of the outside pipe end.

11 Claims, 3 Drawing Sheets

US 8,210,575 B2

BAND CLAMP WITH EMBOSSED GASKET FOR SLOTTED PIPE LAP JOINTS

CROSS-REFERENCE TO RELATED APPLICATION

This application claims the priority of U.S. Provisional Application No. 61/228,402, filed Jul. 24, 2009, the entire contents of which are hereby incorporated by reference.

TECHNICAL FIELD

This invention relates to pipe clamps used for interconnecting pipes and other tubular bodies and, more specifically, to gasketed band clamps and pipe lap joints formed using the band clamps.

BACKGROUND OF THE INVENTION

Pipe clamps are commonly used to join variously structured pipes and other tubular bodies in exhaust systems. In many applications, it is desirable for the joint between the pipes to provide a fluid-tight seal and to have good resistance against axial separation. One type of pipe clamp is a band clamp which is used with telescopically overlapping pipes, and another type is a pipe coupler which is used with end-to-end abutting pipes. Both types typically include a band to be placed and tightened over the pipes, and both types can include a sealing sleeve and/or gasket to be tightened beneath the band.

SUMMARY OF THE INVENTION

In accordance with one embodiment of the invention there is provided a pipe lap joint that includes an inside pipe, outside pipe, and band clamp. The inside pipe has a first pipe end that telescopically fits within a (second) pipe end of the outside pipe. The outside pipe has a slot located in the second pipe end. The band clamp includes a band located over said second pipe end and extending circumferentially from a first end to a second end with a tightening mechanism being used to draw the ends together for tightening of the band. The band clamp also includes a gasket located over the first pipe end and within the second pipe end such that it is at least partially sandwiched between the first and second pipe ends. The gasket has an embossment extending radially outwardly from an outer surface of the gasket and being received at least partly in the slot of the outside pipe. In use the slot enables the outside pipe to be somewhat radially collapsed during tightening of the clamp, and the embossment helps provide a fluid tight seal at the location of the slot.

In accordance with another embodiment of the invention, there is provided a band clamp that includes a band, tightening mechanism, and gasket. The band extends circumferentially from a first end to a second end and is sized to fit over an outside pipe end to be clamped. The tightening mechanism is connected to the band at the first and second end. The tightening mechanism includes at least one fastener to bring the first and second ends toward each other to tighten the band over the outside pipe end. The gasket is constructed to fit over an inside pipe end and within the outside pipe end such that the gasket is at least partially sandwiched between said inside and outside pipe ends. The gasket has an embossment extending radially outwardly from an outer surface of the gasket and being constructed to be received at least partly within a slot of the outside pipe end.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENT(S)

Figure 1:
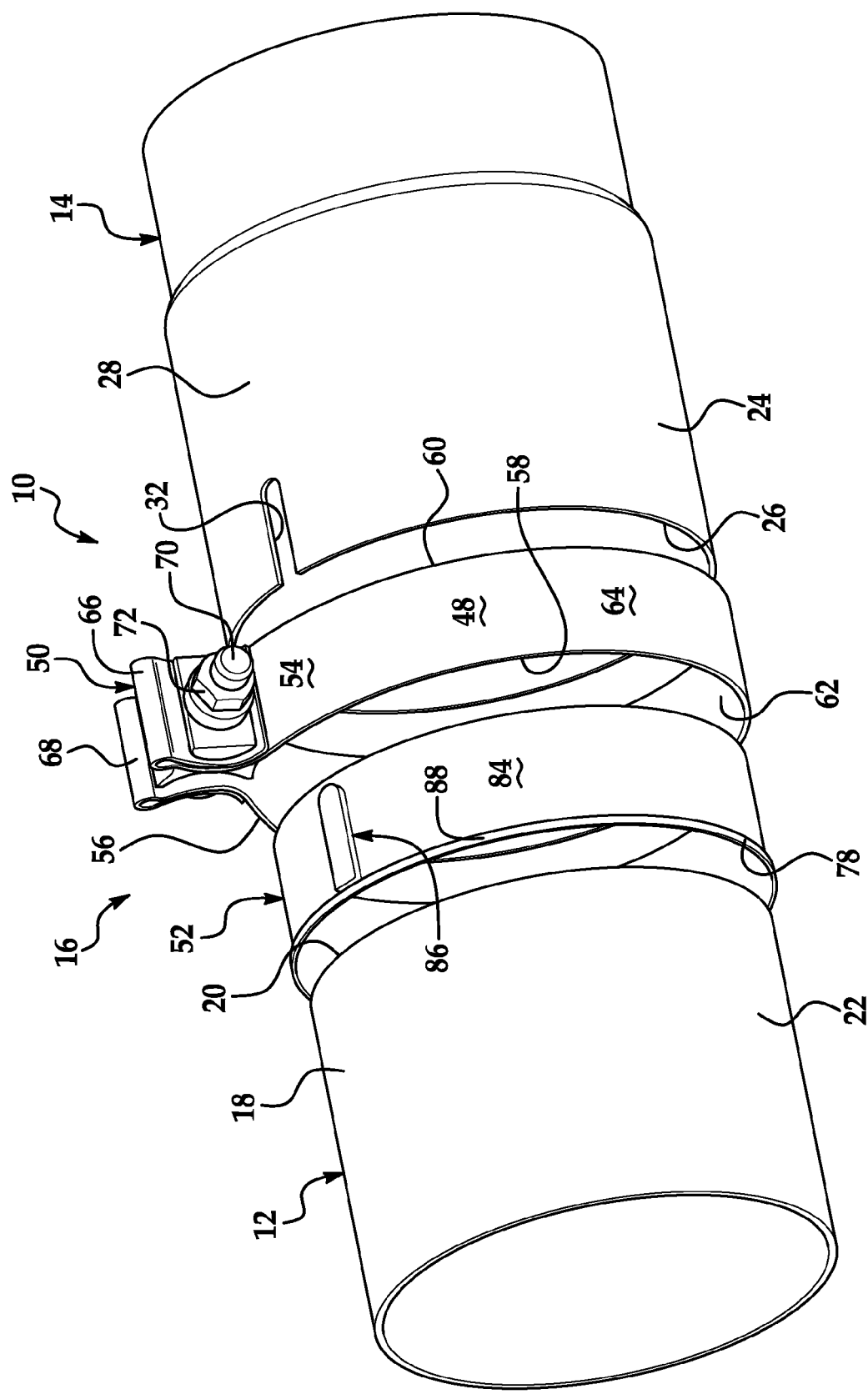
FIG. 1 is an exploded view of an exemplary embodiment of a pipe lap joint.

Referring to the drawings, FIGS. 1-5 show an exemplary embodiment of a pipe lap joint 10 used to provide a fluid-tight seal with good resistance against axial separation in an exhaust system. As used herein, the term pipe(s) refers to tubular structures such as exhaust pipes, catalytic converters, diesel particulate filters, and other exhaust system components, that can be used in automotive applications such as heavy trucks and passenger cars, or that can be used in non-automotive applications such as generators and agricultural equipment, to name but a few examples. The pipe lap joint 10 includes a gasket with an embossment that interacts with a slot located in a pipe in order to provide a low-leak seal at the pipe lap joint, while permitting a sufficient amount of axial play between overlapping pipes that is required in some applications to accommodate manufacturing and/or assembly tolerances. The pipe lap joint 10 is also suitable for high temperature (e.g., 550° C.) applications such as, in an automotive application, at a location downstream of an associated exhaust manifold and upstream of an associated catalytic converter (neither shown) by virtue of, among other things, the axial length of a gasketed seal formed. In general, the pipe lap joint 10 includes a pair of pipes each having a cylindrical pipe end that defines an axial direction extending along or generally parallel to a center lengthwise axis of the cylindrical pipe end, a radial direction extending outwardly from the axis along any radius of the pipe end, and a circumferential direction extending along a circumference of the pipe end.

Referring to FIG. 1, in the illustrated embodiment the pipe lap joint 10 includes a first or inside pipe 12, a second or outside pipe 14, and a band clamp 16. The inside pipe 12 has a diametrically-reduced size relative to the outside pipe 14 and acts as the male member inserted into the outside pipe when the pipes are telescopically overlapped. The inside pipe 12 has a first pipe end 18, a first terminal end or edge 20, and a first outer surface 22. In one example, the inside pipe 12 is made of a metal such as a 400 series stainless steel; of course other metals or materials are possible.

The outside pipe 14 has a diametrically-enlarged section relative to the inside pipe 12 and acts as the female member that receives the inside pipe when the pipes are telescopically overlapped. In other embodiments not illustrated, the outside pipe 14 could have a uniformly diametrically-enlarged size throughout its entire axial extent. The diametrically-enlarged section provides an amount of axial give or play (e.g., 30 mm) to allow different telescopic insertion depths of the inside pipe 12 into the outside pipe 14; the exact insertion depth for a given application can depend on, among other things, the acceptable dimensional tolerances and manufacturing accuracies of the pipes and/or of components associated with the pipes. The outside pipe 14 has a second pipe end 24, a second terminal end or edge 26, a second outer surface 28, an inner surface 30, and a slot 32. In one example, the outside pipe 14 is made of a metal such as a 400 series stainless steel; of course other metals or materials are possible.

Figure 2:
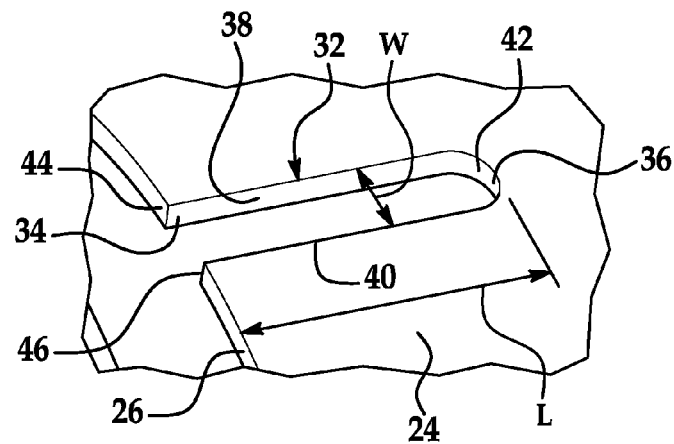
FIG. 2 is an enlarged view of a slot of the pipe lap joint of FIG. 1.

The slot 32 provides a spaced relief for circumferential closure and collapse of the outside pipe 14 upon tightening of the band clamp 16, through which the outside pipe tightens down on the inside pipe 12 and exerts circumferential and radial forces to the inside pipe. Referring to FIGS. 1 and 2, in the uncollapsed state the slot 32 is generally oval-shaped, has an open end 34 located at the second terminal end 26, has a closed end 36 located axially inward of the second terminal end, and has an axial length L and a circumferential width W which is substantially uniform throughout the axial length. The slot 32 also has a first side wall 38, a second side wall 40 confronting the first side wall, and an end wall 42. In the uncollapsed state, the first and second side walls 38, 40 are each generally linear in the axial direction and are generally parallel with respect to each other (a so-called straight slot). The first and second side walls 38, 40 make first and second sharp corners 44, 46 with the second terminal end 26, and make rounded corners with the end wall 42. In other embodiments, the slot can have different constructions and configurations. For example, the circumferential width need not be uniform throughout the axial length, the first and second side walls can be nonlinear and need not be parallel with respect to each other, and multiple slots can be spaced at other circumferential locations on the second pipe end.

In the illustrated embodiment, the band clamp 16 includes a band 48, a tightening mechanism 50, and a gasket 52. Referring to FIG. 1, in use the band 48 makes metal-to-metal contact with the second outer surface 28 of the outside pipe 14 and forms a circumferential metal-to-metal seal therearound. The band 48 can be made from a sheet of steel, such as grade 409 stainless steel or another suitable material, that is metal-worked into an open loop. The band 48 extends in the circumferential direction from a first end 54 to a second end 56, and extends in the axial direction from a first side 58 to a second side 60. The radially-inwardly facing side the band 48 has an inner surface 62, and the radially-outwardly facing side the band has an outer surface 64. The band 48 also has a first and second flange 66, 68 which extend from respective first and second ends 54, 56, and are formed by portions of the band folded away from each other and back onto themselves to produce a pair of radially-protruding loops, each loop having an inner and an outer leg. The band 48 can have an axial length which spans the circumferential width W of the slot 32.

Figure 3:
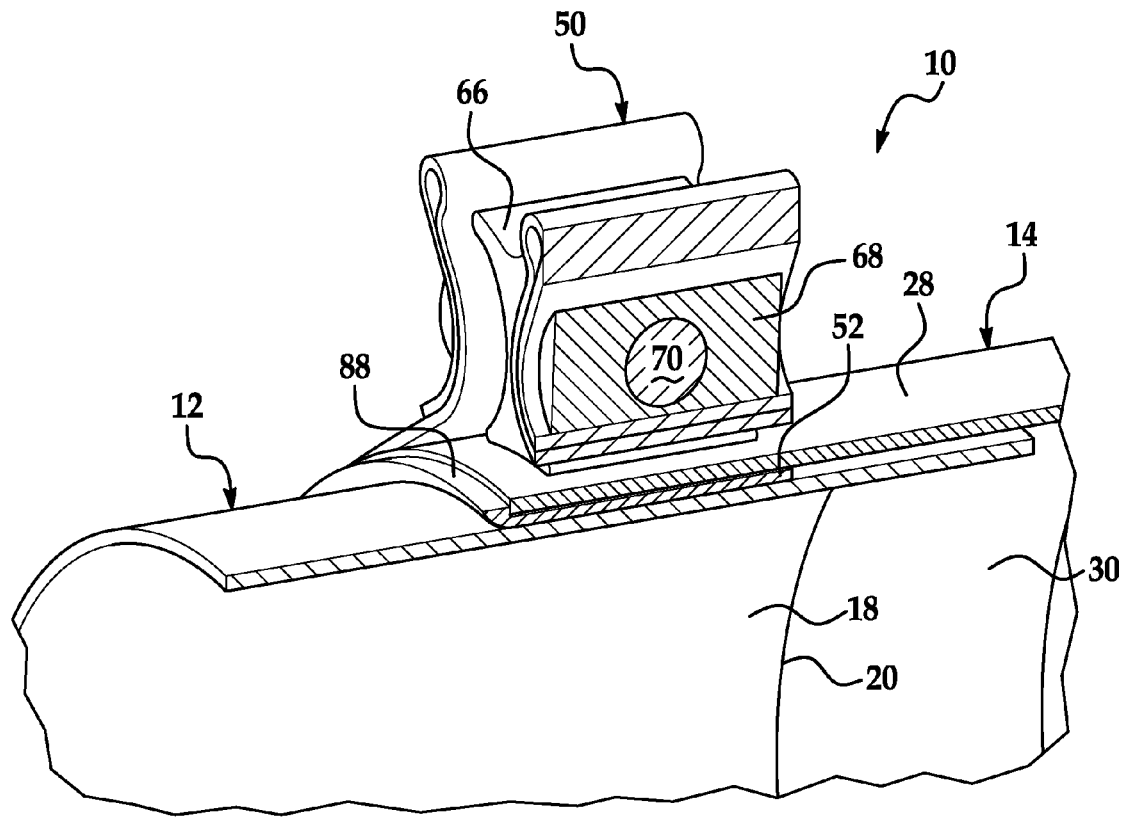
FIG. 3 is an enlarged cross-sectional view of the pipe lap joint of FIG. 1 shown in an assembled state.
Figure 4:
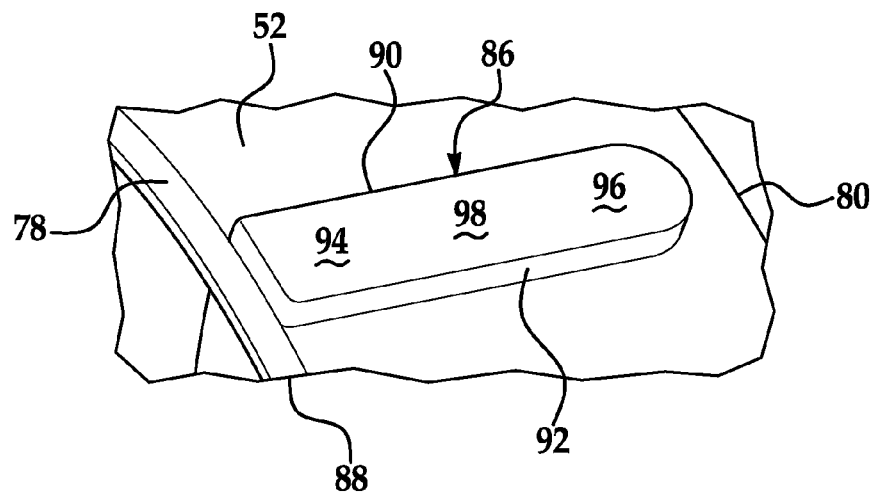
FIG. 4 is an enlarged view of an embossment of the pipe lap joint of FIG. 1.

Referring now to FIGS. 1 and 3, the tightening mechanism 50 is connected to the band 48 and can be tightened and loosened to bring the first and second ends 54, 56 toward and away from each other. In the illustrated embodiment, the tightening mechanism 50 includes a single bolt-and-nut fastener combination, a reaction block 66, and a backing plate 68. The fastener combination includes a T-bolt 70 and a nut 72, the T-bolt having a half-cylindrical head for evenly distributing tightening forces across the axial width of the flanges, and having a partly threaded shank that receives the nut 72. The reaction block 66 has a double convex shape, has a passage for receiving the T-bolt 70, and has a radially-inward-facing surface. The backing plate 68 has a half-cylindrical shape and also has a passage for receiving the T-bolt 70. When assembled, T-bolt 70 is also inserted in passages located in the first and second flanges 66, 68. When tightened upon rundown, the nut 72 is screwed down on the T-bolt 70, and the half-cylindrical head of the T-bolt, the reaction block 66, and the backing plate 68 act together to pull the first and second ends 54, 56 toward each other and cause a radially inward force that is distributed around the circumference of the band 48. The reaction block 66 can be sized such that its radially inwardly-facing surface engages the outer surface 28 of pipe 14 to apply a radially-inward force on the pipe at the gap in the band 48 where the flanges are located. In other embodiments, the tightening mechanism can have different constructions and configurations. For example, the tightening mechanism can have a double bolt-and-nut fastener combination, the reaction block and/or backing plate need not be provided, and other components not shown can be provided.

Referring to FIGS. 1 and 3-5, in use the gasket 52 is sandwiched between the inside and outside pipes 12, 14 in an overlapping arrangement and forms a circumferential gasket-to-metal seal on both sides of the gasket therearound. The gasket 52 can be made of a relatively soft material that is compressed when the band 48 is tightened; suitable materials include a graphite-based material, a mica-based material, a ceramic fiber, or a fiber glass, to name but a few examples. In the illustrated embodiment, the gasket 52 is a continuous ring with a closed loop structure. The gasket 52 extends axially from a first side 78 to a second side 80. On a radially-inwardly facing side the gasket 52 has an inner surface 82, and on a radially-outwardly facing side the gasket has an outer surface 84. In assembly, the gasket 52 can be preassembled to either the inside pipe 12 or the outside pipe 14; for example, the inner surface 82 can have a pressure sensitive adhesive disposed thereon to adhere to the first outer surface 22 and/or the outer surface 84 can have a pressure sensitive adhesive disposed thereon to adhere to the inner surface 30. The gasket 52 can have an axial length measured between the first and second sides 78, 80 which is greater than the axial length of the band 48 and which spans the circumferential width W of the slot 32, and can have a radial height of about 1.3 mm. Of course other axial lengths and radial heights are possible; for example, an axial width that is less than that of the band 48. In other embodiments the gasket can have different constructions. For example, the gasket need not be a closed loop and instead could be a split gasket with an open loop structure.

In the exemplary embodiment, the gasket 52 also has an embossment 86 and a flange 88. The embossment 86 is received in the slot 32 and at least partially fills the slot when the slot is both in an uncollapsed state and a collapsed state (shown filled in FIG. 5). In general, the embossment 86 is constructed, sized, and shaped to have a structure complementing that of the slot 32, and can have an interference fit with the slot or can fit freely in the slot upon insertion. For example, in the illustrated embodiment, the embossment 86 has substantially the same width and length as that of the slot 32. The embossment 86 can be formed one-piece with the gasket 52 and, in the illustrated embodiment, is a radially protruding and axially and circumferentially extending oval-shaped structure. The embossment 86 can have a protrusion or radial height equal to or greater than the radial thickness of the outside pipe's wall at the second pipe end 24; in one example, the radial height of the embossment is about 2.5 mm; in another example, the radial height of the embossment 86 is 0.5 mm to 1.5 mm greater than the radial height of the outside pipe 14 at the slot 32. Of course other radial heights are possible. The embossment 86 has a first side wall 90, a second side wall 92, a rearward portion 94, a forward portion 96, and an outer surface 98. In the uncompressed state, the first and second side walls 90, 92 are each generally linear in the axial direction and are generally parallel with respect to each other and with respect to the side walls 38, 40 of the slot 32. In use, the embossment 86 generally becomes compressed both in the radial direction and in the circumferential direction; in this sense, the embossment 86 becomes more dense upon compression. Circumferential compression of the embossment 86 results from the opposing walls 38, 40 of slot 32 being forced towards each other during radial collapsing of the pipe end 24, and the radial compression of the embossment results from this same radial collapsing of the pipe end 24. In other embodiments, the embossment 86 can have different constructions and configurations. For example, the first and second side walls can be nonlinear and need not be parallel with respect to each other, and multiple embossments can be spaced at other circumferential locations on the gasket depending on the number of slots provided.

Referring to FIG. 3, the flange 88 is used to axially position, maintain, and locate the gasket 52 against the second terminal end 26 of the outside pipe 14, and/or is used to axially position, maintain, and locate the outside pipe on the gasket. In the illustrated embodiment, the flange 88 is a circumferentially continuous and radially protruding lip or rim located at the first side 78 of the gasket 52 that seats with the second terminal end 26.

Figure 5:
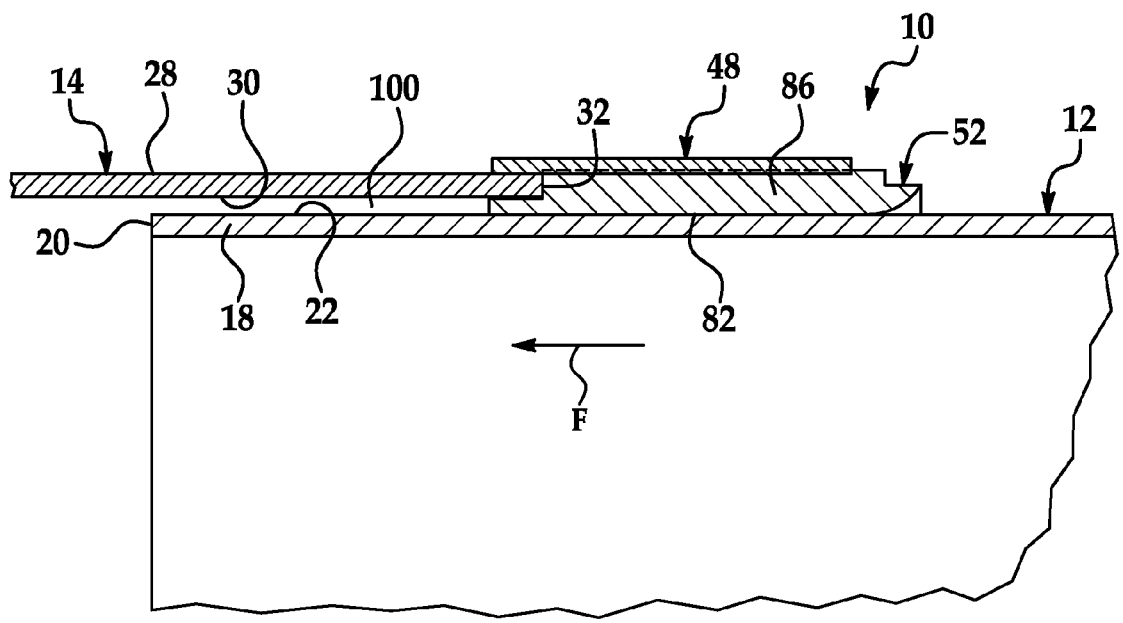
FIG. 5 is an enlarged cross-sectional view of the pipe lap joint of FIG. 1 shown in an assembled state and taken at the slot and at an embossment of the pipe lap joint.

Referring to FIGS. 1, 3, and 5, in assembly the band 48 is placed over (radially outside) the outside pipe 14, and the gasket 52 is placed either over the inside pipe 12 or within (radially inside) the outside pipe. The inside and outside pipes 12, 14 are telescopically brought together to form an overlapping region between the first and second pipe ends 18, 24 such that the gasket 52 is positioned therebetween. This assembly is done such that the embossment 86 is received within the slot 32.

Sometimes, upon rundown of the tightening mechanism 50, the exerted radial and circumferential forces can cause a puckering, or radial separation, between the confronting or contacting first outer surface 22 of the inside pipe 12 and inner surface 30 of the outside pipe 14, which forms a gap therebetween, such as shown at 100 if FIG. 5, and this gap can increase in size over time. In some cases without a gasket thereat, this can be a problem. For example, fluid F flowing from the inside pipe 12 downstream to the outside pipe 14, and when crossing from the first pipe end 18 to the second pipe end 24, can reverse directions around the first terminal end 20 (so-called eddy current flow) and can enter the space or gap 100 formed between confronting first outer surface 22 and inner surface 30. From there, the fluid can leak into the atmosphere. This can especially occur at a slot in the outside pipe 14.

The exemplary gasket 52, however, can fill the gap 100 and thus substantially prevent the leak. Upon rundown, the gasket 52 gets radially and circumferentially compressed and can form a resulting bulge or other structure immediately outside of the second terminal end 26 and, depending on the telescopic insertion depth, immediately outside of the first terminal end 20. This bulge, or bulges, can augment the gasket-to-metal seal thereat. Furthermore, the embossment 86 fills the gap 100 in proximity of the slot 32 and substantially prevents any leakage thereat. Upon rundown and collapse of the slot 32, the embossment 86 gets squeezed and its forward portion 96 migrates toward and around the closed end 36, thus increasing the amount of gasket material and augmenting the gasket-to-metal seal thereat. The first and second side walls 38, 40 of the slot 32 converge and slant toward each other at the open end 34 with the sharp corners 44, 46 constituting the closest physical points of the side walls, while the end wall 42 substantially maintains its circumferential width. The sharp corners 44, 46 do not make contact with each other, but in some embodiments this may be done. The first and second side walls 38, 40 respectively engage the first and second side walls 90, 92 of the embossment 86, making contact at one or more points along their respective axial lengths and forming gasket-to-metals seals thereat. The resulting circumferential squeeze on the embossment 86 forces parts of it, including the forward portion 96, to bunch-up adjacent the closed end 36.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, either a single or multiple slots can be used, and in some embodiments, the slot need not be open to the terminal end, but can be completely circumscribed by the material of the pipe end. Also, in other embodiments, the gasket embossment can be located on the radially inward surface of the gasket and mate with a slot formed in the inner pipe end. A separate sealing slot can then be used on the outer pipe if desired to permit it to circumferentially collapse against the gasket. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A pipe lap joint, comprising:
an inside pipe having a first pipe end;
an outside pipe telescopically receiving said first pipe end and having a second pipe end and a slot, said slot being located in said second pipe end;
a gasket located over said first pipe end and within said second pipe end and at least partly sandwiched between said first and second pipe ends, said gasket having an embossment extending radially outwardly from an outer surface of said gasket and being received at least partly in said slot of said outside pipe;
a band located over said second pipe end and extending circumferentially from a first end to a second end; and
a tightening mechanism connected to said band at said first and second ends, said tightening mechanism including at least one fastener to bring said first and second ends toward each other to tighten said band.

2. A pipe lap joint as defined in claim 1, wherein, upon tightening of said band, said slot at least partly circumferentially collapses and compresses said embossment.

3. A pipe lap joint as defined in claim 2, wherein said slot has an open end located at a terminal end of said second pipe end and has a closed end located axially inward of said terminal end, and wherein said at least partial circumferential collapsing of said slot causes a portion of said embossment to migrate toward said closed end of said slot.

4. A pipe lap joint as defined in claim 1, wherein said embossment has substantially the same width and length dimensions as said slot.

5. A pipe lap joint as defined in claim 1, wherein said gasket has an outwardly-extending flange that, upon insertion of said gasket into said second pipe end, engages a terminal end of said second pipe end, thereby restricting further insertion of said gasket into said second pipe end.

6. A pipe lap joint as defined in claim 5, wherein said gasket extends axially from a first edge to a second edge and wherein said flange is located at one of said edges.

7. A pipe lap joint as defined in claim 1, wherein said embossment has a radial height which is about 0.5 mm to 1.5 mm greater than a radial height of said outside pipe.

8. A band clamp, comprising:
a band extending circumferentially from a first end to a second end and being sized to fit over an outside pipe end to be clamped;
a tightening mechanism connected to said band at said first and second ends, said tightening mechanism including at least one fastener to bring said first and second ends toward each other to tighten said band over the outside pipe end; and
a gasket constructed to fit over an inside pipe end and within the outside pipe end such that the gasket is at least partially sandwiched between said inside and outside pipe ends, said gasket having an embossment extending radially outwardly from an outer surface of said gasket and extending circumferentially along a portion of said outer surface of said casket, said embossment being constructed to be received at least partly within an axially extending slot of said outside pipe end.

9. A band clamp as defined in claim 8, wherein said embossment has a length and a substantially uniform width along its length.

10. A band clamp as defined in claim 8, wherein said gasket extends axially from a first edge to a second edge and wherein said gasket has an outwardly extending flange at only one of said edges.

11. A band clamp as defined in claim 8, wherein said embossment has a radial height which is about 0.5 mm to 1.5 mm greater than a radial height of the outside pipe end.

* * * * *